US010239755B2

(12) United States Patent
Wang et al.

(10) Patent No.: US 10,239,755 B2
(45) Date of Patent: Mar. 26, 2019

(54) METHOD FOR PREPARING CHLORINE GAS THROUGH CATALYTIC OXIDATION OF HYDROGEN CHLORIDE

(71) Applicant: Finings Co. Ltd., Huai'an, Jiangsu (CN)

(72) Inventors: Nongyue Wang, Shanghai (CN); Xiongwei Qu, Shanghai (CN); Guohua Li, Shanghai (CN); Quanzhong Zhao, Shanghai (CN); Jianming Shao, Shanghai (CN); Guoqiang Wen, Shanghai (CN)

(73) Assignee: FININGS CO. LTD., Huai'an (CN)

( * ) Notice: Subject to any disclaimer, the term of this patent is extended or adjusted under 35 U.S.C. 154(b) by 0 days.

(21) Appl. No.: 15/629,569

(22) Filed: Jun. 21, 2017

(65) Prior Publication Data

US 2017/0283260 A1    Oct. 5, 2017

Related U.S. Application Data

(63) Continuation of application No. PCT/CN2015/079486, filed on May 21, 2015.

(30) Foreign Application Priority Data

Dec. 22, 2014  (CN) .......................... 2014 1 0814972

(51) Int. Cl.
*C01B 7/04* (2006.01)
*C01B 7/07* (2006.01)
(Continued)

(52) U.S. Cl.
CPC .................. *C01B 7/04* (2013.01); *B01J 8/04* (2013.01); *B01J 8/26* (2013.01); *B01J 20/08* (2013.01);
(Continued)

(58) Field of Classification Search
CPC ................................ C01B 7/04; C01B 7/0743
See application file for complete search history.

(56) References Cited

U.S. PATENT DOCUMENTS 4,774,070 A * 9/1988 Itoh ........................... C01B 7/04
                                                              423/240 R
4,910,430 A   3/1990 Ito et al.
(Continued)

FOREIGN PATENT DOCUMENTS

CN           1417107 A     5/2003
CN         103752270 A     4/2014
(Continued)

OTHER PUBLICATIONS

U.S. Appl. No. 15/629,617, filed Jun. 21, 2017, Shanghai Fanglun New Material Technology Co., Ltd.

*Primary Examiner* — Ngoc-Yen Nguyen
(74) *Attorney, Agent, or Firm* — Mei & Mark LLP; Manni Li (57) ABSTRACT

A method for preparing chlorine gas through catalytic oxidation of hydrogen chloride is carried out by one-time hydrogen chloride feeding and multi-stage oxygen feeding, one-time oxygen feeding and multi-stage hydrogen chloride feeding, or both, returning a product gas stream without separation thereof, and optionally carrying out heat insulation means. In the present invention, excessive reaction heat concentration is prevented, therefore, the method of the present invention is a chlorine gas recovery method implemented through the Deacon catalytic oxidation of hydrogen chloride that may be industrialized.

23 Claims, 3 Drawing Sheets (51) Int. Cl.
    *B01J 8/04*    (2006.01)
    *B01J 8/26*    (2006.01)
    *B01J 20/08*   (2006.01)
    *B01J 20/16*   (2006.01)
    *B01J 23/89*   (2006.01)

(52) U.S. Cl.
    CPC ......... *B01J 20/165* (2013.01); *B01J 23/8946* (2013.01); *C01B 7/0743* (2013.01); *B01J 2208/027* (2013.01)

(56) References Cited

U.S. PATENT DOCUMENTS

| | | |
|---|---|---|
| 4,994,256 A | 2/1991 | Minet et al. |
| 5,084,264 A | 1/1992 | Lyke |
| 2004/0052718 A1 | 3/2004 | Walsdorff et al. |
| 2004/0115118 A1 | 6/2004 | Olbert et al. |
| 2005/0175528 A1 | 8/2005 | Walsdorff et al. |
| 2007/0274898 A1 | 11/2007 | Weber et al. |
| 2007/0274901 A1 | 11/2007 | Wolf et al. |
| 2007/0274902 A1 | 11/2007 | Olper et al. |
| 2008/0159948 A1 | 7/2008 | Sesing et al. |
| 2008/0233027 A1* | 9/2008 | Brettschneider ...... C01B 7/0743 423/240 R |
| 2010/0098616 A1* | 4/2010 | Wolf ...................... B01J 27/138 423/502 |
| 2010/0260660 A1 | 10/2010 | Schellen et al. |
| 2013/0216470 A1 | 8/2013 | Wolf et al. |
| 2015/0315021 A1 | 11/2015 | Nishimoto |

FOREIGN PATENT DOCUMENTS

| | | |
|---|---|---|
| JP | 2003016825 A | 1/2003 |
| RU | 2320534 C1 | 3/2008 |
| WO | WO 2011/118386 A1 | 9/2011 |

\* cited by examiner

METHOD FOR PREPARING CHLORINE GAS THROUGH CATALYTIC OXIDATION OF HYDROGEN CHLORIDE

CROSS-REFERENCE TO RELATED APPLICATIONS

The subject application is a continuation of PCT/CN2015/079486 filed on May 21, 2015 and claims priority on Chinese application no. 201410814972.4 filed on Dec. 22, 2014. The contents and subject matter of the PCT and Chinese priority application are incorporated herein by reference.

TECHNICAL FIELD

The present invention relates to a method for preparing chlorine gas, particularly, preparation of chlorine gas through catalytic oxidation of hydrogen chloride.

BACKGROUND OF THE INVENTION

Chlorine gas is a very important chemical product and raw material, and is widely used in many industries such as metallurgical, textile, pharmaceutical, and petrochemical industries. Only one of two chlorine atoms in the chlorine gas molecule can be effectively utilized when the reaction occurs, so the effective utilization rate of chlorine gas is no more than 50%, namely, 1 mole of a by-product hydrogen chloride is generated per 1 mole chlorine gas consumed. Thus, in various industries, the amount of hydrogen chloride generated as by-product is enormous. How to deal with the large amount of hydrogen chloride has become an issue to be urgently solved. Currently, the main measure actually adopted in the industry is to absorb hydrogen chloride with water to prepare low-value, inexpensive hydrochloric acid for sale; since hydrochloric acid is inexpensive and has a limited market demand, the preparation of hydrochloric acid from hydrogen chloride has become a burden rather than a resource. Another measure is to neutralize hydrogen chloride with a base for direct discharge; however, with increasing sophistication of environmental laws and regulations, environmental protection standards of various ways of discharge have become very stringent.

Thus, the methods of preparing chlorine gas from hydrogen chloride that can be industrialized have become a continuing interest in the art. The method of preparing chlorine gas directly from the by-product hydrogen chloride can not only achieve closed circulation of chlorine element, but also achieve zero emissions in the reaction process. Up to now, the methods of preparing chlorine gas from hydrogen chloride can be divided into three main categories: electrolytic method, direct oxidation method, and catalytic oxidation method. The electrolytic process has a high energy consumption and uses an ionic membrane that needs to be frequently replaced, resulting in a very high cost, wherein the cost per ton chlorine gas recovered is greater than 4,000 RMB. The direct oxidation method suffers from a low yield and cannot be industrialized. In contrast to the electrolytic method and the direct oxidation method, the catalytic oxidation method, particularly, the Deacon catalytic oxidation, exhibits the highest potential for industrialization.

The Deacon reaction is one reaction for oxidation of hydrogen chloride into chlorine gas in the presence of a support loaded with a catalyst. The equation of the Deacon reaction is:

$$2HCl + 1/2 O_2 \xrightarrow{catalyst} Cl_2 + H_2O.$$

The properties of the catalyst have a great influence on the Deacon reaction. Thus, in order to achieve industrialization of the Deacon reaction, domestic and foreign researchers have conducted intensive studies in an attempt to find a suitable catalyst. However, to date, the Deacon method still has disadvantages: for example, the catalyst activity remains to be further improved; in a fixed bed reactor, too high hot-spot temperature in the bed often results in reduced activity and shortened lifetime of the catalyst, and thus, the catalyst needs to be frequently replaced; in a fluidized bed reactor, the catalyst is seriously worn and needs to be continuously supplemented.

The fluidized bed reactors using the Deacon method disclosed in CN87104744 and U.S. Pat. No. 4,994,256 require that the catalysts have sufficient hardness and abrasion resistance and that the walls of the reactors have strong wear resistance. The fixed bed reactors using the Deacon method disclosed in US2004115118, JP2001199710, and U.S. Pat. No. 5,084,264 use heat dissipation devices having a complex structure to reduce the harm of reaction overheating on the catalyst lifetime. A reactor system is disclosed in CN101448734 that can use both a fixed bed and a fluidized bed, but this invention does not disclose the effective lifetime of the catalysts therein.

Given that the catalytic oxidation of hydrogen chloride is exothermic and many catalysts are easily deactivated due to high temperature, it is essential to remove and utilize reaction heat in the Deacon method. The reaction temperature of 600-900° C. on the one hand can result in permanent deactivation of catalysts and on the other hand can result in adverse shifting of the reaction equilibrium toward raw materials at a high temperature, thereby affecting the conversion rate. Accordingly, the advantageous reaction temperature in the Deacon method is 150-600° C.

SUMMARY OF THE INVENTION

The present invention provides a method for preparing chlorine gas through catalytic oxidation of hydrogen chloride by carrying out one-time hydrogen chloride feeding and multi-stage oxygen feeding and/or one-time oxygen feeding and multi-stage hydrogen chloride feeding (providing a gas stream containing hydrogen chloride and a gas stream containing oxygen for oxidation of the gas stream containing hydrogen chloride to a first reactor, and providing a gas stream containing hydrogen chloride and/or a gas stream containing oxygen for oxidation of the gas stream containing hydrogen chloride to downstream reactors) and returning a part of a product gas stream for use without separation thereof. The method of the present application significantly extends the catalyst lifetime and further reduces the production cost in the catalytic oxidation of hydrogen chloride, by carrying out one-time hydrogen chloride feeding and multi-stage oxygen feeding and/or one-time oxygen feeding and multi-stage hydrogen chloride feeding, returning a product gas stream without separation thereof, and optionally carrying out heat insulation means.

In order to overcome the shortcomings of the current technology, the present application provides a method for preparing chlorine gas through catalytic oxidation of hydrogen chloride, which significantly extends the catalyst lifetime and thus reduces the cost in treating hydrogen chloride, by effectively controlling and utilizing the reaction heat. The present method becomes a method that may be industrialized.

In one aspect, the present application is directed to a method for preparing chlorine gas through catalytic oxidation of hydrogen chloride, comprising the steps of:

providing one or more reactors filled with a catalyst that are connected in series or in parallel;

providing a gas stream containing hydrogen chloride and a gas stream containing oxygen for oxidation of the gas stream containing hydrogen chloride to a first reactor of the one or more reactors, and providing a gas stream containing hydrogen chloride and/or a gas stream containing oxygen for oxidation of the gas stream containing hydrogen chloride to downstream reactors, for the catalytic oxidation of hydrogen chloride;

directly returning a part of a product gas stream from a last reactor of the reactors through the catalytic oxidation to any of the one or more reactors without separation thereof; and separating a remainder of the product gas stream from the last reactor of the reactors to obtain chlorine gas.

The beneficial effects of the present application are that the product gas stream without separation thereof is returned so that not only the gas stream containing hydrogen chloride and/or the gas stream containing oxygen for oxidation of the gas stream containing hydrogen chloride can be heated by the heat carried by the unseparated product gas stream itself, resulting in reduced fuel cost in preheating the gas stream containing hydrogen chloride and/or the gas stream containing oxygen, but also the temperature of the Deacon reaction can be further controlled. The present method on the one hand extends the lifetime of the catalyst, and on the other hand reduces the number of devices disposed in the reactors for heat removal and reduces the difficulty in the separation operation, thereby saving the industrialization cost.

The meanings of reference numerals are:

1—first reactor; 2—second reactor; 3—third reactor; 4 and 5—heat exchanger; 6—gas heat exchanger; 7—preheater; 8(I)—fresh gas stream containing hydrogen chloride; 8(II)—gas stream containing hydrogen chloride comprising the fresh gas stream containing hydrogen chloride and recovered hydrogen chloride; 9(I)—fresh gas stream containing oxygen; 9(II)—gas stream containing oxygen comprising the fresh gas stream containing oxygen and recovered oxygen gas; 10—returned product gas stream; 10a, 10b, 10c—respective returned product gas stream entering the reactors; 11—remaining product gas stream; 12—product gas stream after being cooled through the gas heat exchanger 6; 13—recovered oxygen gas (separated from the product gas stream); 14—recovered hydrogen chloride (separated from the product gas stream); 15—recovered chlorine gas (separated from the product gas stream); 16—recovered hydrochloric acid (separated from the product gas stream); 17—mixed gas stream comprising the gas stream containing hydrogen chloride and the gas stream containing oxygen; 18—mixed gas stream comprising the gas stream containing hydrogen chloride and the gas stream containing oxygen after being heat exchanged; 19, 33, 34—gas stream containing oxygen to be provided to the reactors 1, 2, 3 (FIG. 1); 19', 33', 34'—gas stream containing oxygen to be provided to the reactors 1, 2, 3 (FIG. 2); 19", 33", 34"—gas stream containing hydrogen chloride to be provided to the reactors 1, 2, 3 (FIG. 3); 20—separation device for separating a product gas stream in the prior art; 21—mixed gas comprising the mixed gas stream 18 comprising the gas stream containing hydrogen chloride and the gas stream containing oxygen after being heat exchanged and the returned product gas stream 10; 22, 24, 26—product gas stream from each stage reactor; 23—gas stream entering the second reactor after being cooled through the heat exchanger 4; 25—gas stream entering the third reactor after being cooled through the heat exchanger 5; 27—input of a heating/cooling medium; 28—output of the heating/cooling medium; 29, 31—input of a cooling medium; 30, 32—output of the cooling medium.

DETAILED DESCRIPTION OF THE INVENTION

The present inventors have found through research that the main reason for the catalyst deactivation in the Deacon method is an uncontrolled exotherm in the reaction system, thereby resulting in permanent damage to the catalyst. The method of the present application can significantly extend the catalyst lifetime and can further reduce the cost in the catalytic oxidation of hydrogen chloride, by returning a product gas stream without separation thereof and optionally carrying out heat insulation means.

In one aspect, the present application is directed to a method for preparing chlorine gas through catalytic oxidation of hydrogen chloride, comprising the steps of:

1) providing one or more reactors filled with a catalyst that are connected in series or in parallel;

2) providing a gas stream containing hydrogen chloride and a gas stream containing oxygen for oxidation of the gas stream containing hydrogen chloride to a first reactor of the one or more reactors, and providing a gas stream containing hydrogen chloride and/or a gas stream containing oxygen for oxidation of the gas stream containing hydrogen chloride to downstream reactors of the one or more reactors, for the catalytic oxidation of hydrogen chloride;

3) directly returning a part of a product gas stream from a last reactor of the reactors from the catalytic oxidation to any of the one or more reactors without separation thereof;

4) separating a remainder of the product gas stream from the last reactor of the reactors to obtain chlorine gas.

In another aspect, the present application is directed to a method for preparing chlorine gas through catalytic oxidation of hydrogen chloride, comprising the steps of:

1) providing one or more reactors filled with a catalyst that are connected in series or in parallel;

2) providing a gas stream containing hydrogen chloride and a gas stream containing oxygen for oxidation of the gas stream containing hydrogen chloride to a first reactor of the one or more reactors, and providing a gas stream containing hydrogen chloride and/or a gas stream containing oxygen for oxidation of the gas stream containing hydrogen chloride to downstream reactors of the one or more reactors, for the catalytic oxidation of hydrogen chloride;

3) before returning a part of a product gas stream from a last reactor of the reactors to any of the one or more reactors without separation thereof, preferably to a feed inlet of any of the one or more reactors, mixing the part of the product gas stream from the last reactor of the reactors with the gas stream containing hydrogen chloride and/or the gas stream containing oxygen for oxidation of the gas stream containing hydrogen chloride intended to enter any of the one or more reactors, which then is fed to the one or more reactors for the catalytic oxidation;

4) separating a remainder of the product gas stream from the last reactor of the reactors to obtain chlorine gas.

In one preferred embodiment of the method of the present invention, the gas stream containing hydrogen chloride and the gas stream containing oxygen for oxidation of the gas stream containing hydrogen chloride are provided to the first reactor of the one or more reactors, and the gas stream containing oxygen for oxidation of a gas stream containing hydrogen chloride is provided to the downstream reactors of the one or more reactors; and the gas streams containing oxygen for oxidation of a gas stream containing hydrogen chloride provided to the reactors are portions of a desired amount of a gas stream containing oxygen for oxidation of a gas stream containing hydrogen chloride that are distributed among the reactors in any ratio as desired, preferably equally distributed into corresponding parts according to the number of the reactors.

The preferred embodiment further preferably provides a method comprising the steps of:

1) providing one or more reactors filled with a catalyst that are connected in series or in parallel;

2a) providing a gas stream containing hydrogen chloride and a gas stream containing oxygen for oxidation of the gas stream containing hydrogen chloride to a first reactor of the one or more reactors, for the catalytic oxidation of hydrogen chloride;

2b) guiding a product gas stream from the first reactor of the one or more reactors to flow through a heat exchanger and then providing the product gas stream from the first reactor to a downstream reactor, providing a gas stream containing oxygen for oxidation of the gas stream containing hydrogen chloride to the downstream reactor, and sequentially providing a product gas stream from the previous reactor and a gas stream containing oxygen for oxidation of a gas stream containing hydrogen chloride to the remaining downstream reactors;

3) before returning a part of a product gas stream from a last reactor of the reactors to any of the one or more reactors without separation thereof, preferably to a feed inlet of any of the one or more reactors, mixing the part of the product gas stream from the last reactor of the reactors with the gas stream containing hydrogen chloride and/or the gas stream containing oxygen for oxidation of the gas stream containing hydrogen chloride entering any of the one or more reactors, which then is fed to the one or more reactors for the catalytic oxidation;

4) separating a remainder of the product gas stream from the last reactor of the reactors to obtain chlorine gas.

In another particular preferred embodiment of the method of the present invention, an oxygen content in the gas stream containing oxygen entering each of the reactors is greater than a theoretical oxygen consumption required for oxidation of the gas stream containing hydrogen chloride entering the each reactor.

The particularly preferred embodiment may be implemented by, for example, the method comprising: providing a gas stream containing oxygen for oxidation of a gas stream containing hydrogen chloride and a gas stream containing hydrogen chloride to a first reactor of the one or more reactors, and providing a gas stream containing hydrogen chloride to downstream reactors of the one or more reactors; wherein the gas streams containing hydrogen chloride provided to the reactors are portions of a gas stream containing hydrogen chloride to be oxidized that are distributed among the reactors in any ratio as desired, preferably equally distributed into corresponding parts according to the number of the reactors.

The particular preferred embodiment further preferably provides a method comprising the steps of:

1) providing one or more reactors filled with a catalyst that are connected in series or in parallel;

2a) providing a gas stream containing oxygen for oxidation of hydrogen chloride and a gas stream containing hydrogen chloride to a first reactor of the one or more reactors, for the catalytic oxidation of hydrogen chloride;

2b) guiding a product gas stream from the first reactor of the one or more reactors to flow through a heat exchanger and then providing the product gas stream from the first reactor to a downstream reactor, providing a gas stream containing hydrogen chloride to the downstream reactor, and sequentially providing a product gas stream from the previous reactor and a gas stream containing hydrogen chloride to the remaining downstream reactors;

3) before returning a part of a product gas stream from a last reactor of the reactors to any of the one or more reactors without separation thereof, preferably to a feed inlet of any of the one or more reactors, mixing the part of the product gas stream from the last reactor of the reactors with the gas stream containing hydrogen chloride and/or the gas stream containing oxygen for oxidation of the gas stream containing hydrogen chloride entering any of the one or more reactors, which then is fed to the one or more reactors for the catalytic oxidation;

4) separating a remainder of the product gas stream from the last reactor of the reactors to obtain chlorine gas.

Further, in returning a part of a product gas stream from the last reactor of the reactors to any of the one or more reactors without separation thereof, the part of the product gas stream from the last reactor of the reactors is preferably returned to each of the provided reactors without separation thereof; and more preferably, before returning to a feed inlet of each of the reactors, the part of the product gas stream from the last reactor of the reactors is mixed with the gas stream containing hydrogen chloride and/or the gas stream containing oxygen for oxidation of the gas stream containing hydrogen chloride, which then is fed to said reactor for the catalytic oxidation. On the one hand, the method of the present invention can dilute the concentration of the feed reaction gas entering each of the reactors to prevent the vigorous reaction at the inlet of the reactor and thus avoid the formation of too many hot spots; on the other hand, after the mixing is performed, the method of the present invention increases the feed temperature of the feed reaction gas, for which the preheating is not essentially required.

Further, in returning a part of a product gas stream from the last reactor of the reactors to each of the provided reactors without separation thereof, the returned product gas stream may be distributed among the reactors in any ratio, for example, reasonably distributed depending on the operation conditions of the reactors; wherein preferably, the returned product gas stream is equally distributed into corresponding parts according to the number of the reactors, for respectively being returned to the reactors.

The reactor according to the present application preferably is a adiabatic reactor. A heat exchanger may be connected between the reactors for reaction heat removal;

namely, each of the reactors optionally has a heat exchanger disposed therebehind. Preferably, the heat exchanger disposed behind the last reactor of the reactors is a gas heat exchanger, and the heat exchangers disposed behind the rest of the reactors may be those well-known to a person skilled in the art, such as a tube bundle heat exchanger, plate heat exchanger, or gas heat exchanger.

It is preferred in the present application that, the remainder (or all after the reaction is completed, and a person skilled in the art also can understand that the last portion of the product gas stream may not be returned) of the product gas stream (at a high temperature) from the catalytic oxidation is passed through a gas heat exchanger for heat exchange before separation thereof, wherein the heat exchange is preferably performed in the gas heat exchanger using the gas stream containing hydrogen chloride and/or the gas stream containing oxygen for oxidation of the gas stream containing hydrogen chloride intended to enter the first reactor as a cooling medium; preferably, the gas stream containing hydrogen chloride and/or the gas stream containing oxygen for oxidation of the gas stream containing hydrogen chloride after being heat exchanged is mixed with the returned part of the product gas stream from the third-stage reactor before being provided to the first reactor, and then is fed to the first reactor for the catalytic oxidation of hydrogen chloride. The temperature of the product gas stream is reduced after the heat exchange. The temperature of the gas stream containing hydrogen chloride and/or the gas stream containing oxygen for oxidation of the gas stream containing hydrogen chloride as the cooling medium is increased after the heat exchange, and then the gas stream containing hydrogen chloride and/or the gas stream containing oxygen for oxidation of the gas stream containing hydrogen chloride after being heat exchanged is provided to the first reactor for the catalytic oxidation of hydrogen chloride.

The separation to obtain chlorine gas according to the present invention is performed on a part or all of the product gas stream via dehydration, removal of residual hydrogen chloride, and oxygen gas removal through a conventional separation process such as condensation, adsorption, or the like, to obtain chlorine gas.

It is preferred in the present application that (unreacted) hydrogen chloride and/or oxygen gas separated from the product gas stream may be provided again to the catalytic oxidation; separated hydrogen chloride (or hydrogen chloride generated by vaporization of the hydrochloric acid) and/or oxygen gas may also be returned to the one or more reactors.

In all embodiments of the present invention, preferably, a volume ratio of the part of the product gas stream returned to the reactors without separation thereof (returned product gas stream) to the remainder of the product gas stream (remaining product gas stream) is 0.25:0.75-0.75:0.25, preferably 0.35:0.65-0.45:0.55.

In all embodiments of the present invention, preferably, a feed volume ratio of the gas stream containing hydrogen chloride (calculated based on pure hydrogen chloride) to the gas stream containing oxygen gas (calculated based on pure oxygen) for oxidation of the gas stream containing hydrogen chloride is 1:2-5:1, preferably 1:1.2-3.5:1, more preferably 1:1-3:1.

In one preferred embodiment of the method of the present invention, a feed volume ratio of the gas stream containing hydrogen chloride (calculated based on pure hydrogen chloride) to the gas stream containing oxygen gas (calculated based on pure oxygen) for oxidation of the gas stream containing hydrogen chloride is 2:1-5:1.

In another particular preferred embodiment of the method of the present invention, a feed volume ratio of the gas stream containing hydrogen chloride (calculated based on pure hydrogen chloride) to the gas stream containing oxygen gas (calculated based on pure oxygen) for oxidation of the gas stream containing hydrogen chloride is 1:2-2:1, preferably 0.9:1.1-1.1:0.9.

In all embodiments of the present invention, preferably, the pressure within the reactors is 0.1-1 MPa.

In all embodiments of the present invention, preferably, the feed gas temperature of the reactors is 250-450° C., preferably 300-380° C.

The "catalyst" according to the present application is a conventional catalyst capable of reacting hydrogen chloride gas and oxygen gas via oxidation to generate chlorine gas and water. Suitable catalysts include a copper compound and/or a ruthenium compound, preferably a copper compound and/or a ruthenium compound loaded onto alumina or titanium dioxide as a support, for example, alumina loaded with copper chloride or ruthenium chloride, preferably a ruthenium compound. The suitable catalysts according to the present application may also comprise other co-catalysts, for example, compounds of metals such as gold, palladium, platinum, osmium, iridium, nickel, or chromium, alkali metals, alkaline-earth metals, and rare earth metals. The suitable catalysts may have various shapes, for example, annular, cylindrical, spherical shapes, and it is preferred that the suitable catalysts have similar external dimensions.

The "reactors" according to the present application are a conventional reactor, for example, a fixed bed or fluidized bed reactor, preferably a fixed bed reactor, which may be filled with a desired catalyst.

Reactors of any material that meets the requirements may be selected for the reactors according to the present application, and reactors made of pure nickel, nickel alloy, quartz, or a ceramic are preferred. If a plurality of reactors are selected, they may be connected in series or in parallel, preferably connected in series, such that the oxidation of hydrogen chloride may be performed in multiple stages. In the present application, 2, 3, 4, 5, 6, 7, 8, 9, or 10, more preferably 3 or 4 reactors are preferably used. Advantageously, a person skilled in the art can understand that some raw material gases in the Deacon reaction (for example, the gas stream containing hydrogen chloride and the gas stream containing oxygen for oxidation of hydrogen chloride) are passed through the reactors in order, and then a gas stream containing hydrogen chloride and/or a gas stream containing oxygen for oxidation of hydrogen chloride is sequentially provided to the downstream reactors. In all embodiments of the present invention, 2, 3, 4, 5, 6, 7, 8, 9, or 10, particularly preferably 3 or 4 adiabatic reactors connected in series are preferably provided.

Particularly, reactors connected in series and reactors connected in parallel may also be used in combination. However, the method of the present invention particularly preferably has reactors that are only connected in series. If reactors connected in parallel are preferably used, then in particular, at most five, preferably three, particularly preferably at most two production lines (optionally comprising reactor sets consisting of reactors connected in series) are connected in parallel. Thus, the method of the present application may be operated with, for example, up to 60 reactors.

The method of the present application may be run in a batch or continuous mode, preferably in a continuous mode.

The "gas stream containing hydrogen chloride" according to the present application includes a fresh gas stream containing hydrogen chloride and a gas stream containing hydrogen chloride comprising recovered hydrogen chloride by the method of the present invention or recovered hydrogen chloride by vaporization of hydrochloric acid. The fresh gas stream containing hydrogen chloride comes from gas streams containing hydrogen chloride as by-products in related industries such as production of isocyanates, production of acid chlorides, or chlorination of aromatic compounds. The gas streams containing hydrogen chloride as by-products may be gas streams containing hydrogen chloride as by-products that are preliminarily treated or gas streams containing hydrogen chloride as by-products directly from related industries that are not treated. The gas streams containing hydrogen chloride as by-products may contain little or no other impurity gases having no influence on the catalytic oxidation of hydrogen chloride and also resulting from the production processes in related industries, depending on the sources. The amounts of other impurity gases are determined by the nature of the production processes in related industries. A person skilled in the art can understand that the so-called waste hydrogen chloride generated in related industries may be a proper raw material for the present application.

The "unreacted gas stream containing hydrogen chloride" according to the present application refers to a gas stream containing hydrogen chloride that is not subjected to the catalytic oxidation through the reactors of the present application.

The "gas stream containing oxygen" according to the present application includes a fresh gas stream containing oxygen and a gas stream comprising recovered oxygen gas by the method of the present invention. The fresh gas stream containing oxygen may be pure oxygen gas or other oxygen-containing gases (e.g. air).

The "product gas stream" according to the present application refers to a mixed gas comprising hydrogen chloride, oxygen gas, water vapor, and chlorine gas from a reactor obtained by the catalytic oxidation. Preferably, the returned product gas stream in the present invention is a mixed gas from a last reactor of the reactors.

The "removal of residual hydrogen chloride" according to the present application may comprise removing residual hydrogen chloride, for example with water, and in particular, when hydrogen chloride is substantially oxidized and the residual amount of hydrogen chloride is comparatively small, after the product gas stream is condensed, water in the product gas stream will absorb all of the residual hydrogen chloride to form hydrochloric acid for separation thereof. The "dehydration" according to the present application may comprise dehydration with, for example, concentrated sulfuric acid, or dehydration with a water removal adsorbent meeting the characteristics of the present system.

The "separation to obtain chlorine gas" according to the present application means that a part of or all of the product gas stream from the catalytic oxidation is separated by a conventional separation process such as condensation, adsorption, or the like, to obtain the chlorine gas.

The specific process for the separation to obtain chlorine gas according to the present invention may be performed by the existing separation technology, comprising (1) removing residual hydrogen chloride, for example with water, drying, and separating chlorine gas from oxygen gas by adsorption, or (2) removing water and a part of hydrogen chloride gas by condensation and drying, separating out liquid chlorine with a low boiling point through a rectification tower, and removing hydrogen chloride by water washing.

The separation process of the product gas stream that may be used in the present application comprises the steps of:

a. Condensation: the product gas stream from the catalytic oxidation of the present invention is condensed; water in the product gas stream from the catalytic oxidation of the present invention along with a part of unreacted hydrogen chloride is condensed as an aqueous hydrochloric acid solution.

b. Deep dehydration: the gas stream after being condensed in step a is subjected to deep dehydration, for example, through concentrated sulfuric acid, a molecular sieve, or by temperature swing adsorption, pressure swing adsorption, to remove residual moisture and reduce corrosiveness of the gas stream.

c. Adsorption: the gas stream after being subjected to deep dehydration in step b is adsorbed by an adsorbent, to separate chlorine gas from oxygen gas.

On the one hand, the adsorption may use an adsorbent capable of adsorbing a large amount of oxygen gas and only a small amount of chlorine gas, such as a carbon molecular sieve and silica gels, to adsorb and remove oxygen gas; the treatment with the adsorbent generates a gas stream containing chlorine with chlorine gas as a main component, wherein a small amount of hydrogen chloride is optionally present. Oxygen gas adsorbed to the adsorbent after the treatment with the adsorbent is subjected to desorption, to obtain a separated gas stream containing oxygen; the adsorbent after the desorption may continue to be used in step c to adsorb and remove oxygen gas.

On the other hand, the adsorption may also use an adsorbent capable of adsorbing a large amount of chlorine gas and only a small amount of oxygen gas, such as fine-pored silica gel and activated carbon, to adsorb and remove chlorine gas, and the treatment with the adsorbent generates a gas stream containing oxygen with oxygen gas as a main component. Chlorine gas adsorbed to the adsorbent after the treatment with the adsorbent is subjected to desorption, to obtain a separated gas stream containing chlorine, wherein a small amount of hydrogen chloride is optionally present; the adsorbent after the desorption may continue to be used in step c to adsorb and remove chlorine gas.

And optionally, d. liquefaction: the gas stream containing chlorine obtained in step c is liquefied, and then is separated to obtain a gas stream containing hydrogen chloride and a gas stream containing chlorine after liquefaction.

The "optionally step d" means that, when the ratio of hydrogen chloride to oxygen gas in the catalytic oxidation is appropriately controlled (for example, the ratio is 0.5:1-1:0.5 based on pure hydrogen chloride and pure oxygen), residual unreacted hydrogen chloride is substantially absorbed during the condensation by water generated in the reaction, and when the amount of hydrogen chloride in chlorine gas obtained in step c is comparatively small, the chlorine gas purity is higher than 99.6% (vol %), which meets the requirements of industrial chlorine, without the need of further liquefaction of chlorine gas to separate of hydrogen chloride; while when the ratio of hydrogen chloride to oxygen gas in the catalytic oxidation is at other values, some hydrogen chloride still remains after the treatments in steps a-c, and in this case, the gas stream containing chlorine gas and hydrogen chloride may be liquefied in step d to separate out a gas stream containing hydrogen chloride.

The condensation conditions in step a are: a temperature of −5-5° C. and a pressure of 0.05-10 MPa.

The specific operation process of temperature swing adsorption drying and pressure swing adsorption drying to remove residual moisture in step b and the specific operation process of separation of chlorine gas and oxygen gas by the pressure and temperature swing adsorption technology in step c can be found in the patent application publication No. CN103752270A, which are briefly described below: the drying in step b is preferably performed using temperature swing adsorption drying or pressure swing adsorption drying, and a composite adsorbent layer with two adsorbents in combination is preferably used in the temperature swing adsorption drying wherein the one adsorbent is an alumina adsorbent placed in an upper portion of an adsorber and the other adsorbent is an adsorbent for dehydration placed in a lower portion of the adsorber, and a volume ratio of the upper alumina adsorbent to the lower adsorbent for deep dehydration is 20-80%:80%-20%. A composite adsorbent layer with two adsorbents in combination is preferably used in the pressure swing adsorption drying wherein the one adsorbent is an alumina adsorbent placed in an upper portion of an adsorber and the other adsorbent is an adsorbent for dehydration placed in a lower portion of the adsorber, and a volume ratio of the upper alumina adsorbent to the lower adsorbent for dehydration is 20-80%:80%-20%.

The temperature swing adsorption drying process in step b is that: the gas stream condensed in step a is passed through the composite adsorbent layer from bottom to top, and the drying is accomplished when the gas stream exits the temperature swing adsorption drying apparatus; in the temperature swing adsorption drying, the adsorption pressure is 0.30-0.80 MPa and the adsorption temperature is 20-50° C. The temperature swing adsorption drying process comprises alternative processes of adsorption and regeneration, wherein the alternative processes of adsorption and regeneration are performed by conventional arrangements (including depressurization, replacement, heating up, and cooling down). The regeneration operation includes desorption and dehydration processes. The desorption pressure of the regeneration operation is 0.01-0.005 MPa and the desorption temperature of the regeneration operation is 110-180° C.; the dehydration process of the regeneration operation uses a carrier gas at a temperature 50-180° C. (feed gas or nitrogen gas), and when the feed gas is used as a carrier gas for regeneration, the feed gas is dried through a pre-drying tower, heated through a steam heater, and fed to an adsorption drying tower to be heated for regeneration and dehydration, wherein the water-bearing carrier gas out of the adsorption tower is cooled, condensed, separated to remove water, and sent back to the feed gas system for recycle.

The pressure swing adsorption drying process in step b comprises alternative processes of adsorption and desorption, wherein the adsorption pressure is 0.40-0.80 MPa, the desorption pressure is 0.02-0.07 MPa, and the adsorption temperature is ambient temperature; the alternative processes of adsorption and desorption processes are performed by conventional arrangements (including pressure equalization, flushing replacement, and vacuum aspiration); the pressure swing adsorption drying process generally is a conventional four-tower process, wherein the flushing replacement uses a dried product gas stream, and tail gases of the flushing replacement and the vacuum aspiration are cooled and dehydrated and then sent to a product gas stream system for hydrogen chloride removal for recycle.

The adsorbent for the molecular sieve drying in step b is a zeolitic molecular sieve or silica gel.

The adsorption in step c preferably adopts the pressure and temperature swing adsorption technology including adsorption and desorption processes, wherein the adsorption pressure is 0.20-0.7 MPa, and the temperature in the adsorption stage is gradually decreased from 40-70° C. to 20-35° C.; the desorption pressure under reduced pressure is −0.07 MPa and the desorption temperature is 40-70° C.; in the adsorption, the gas stream as a feed gas at a temperature less than 40° C. is charged, the adsorption is started, and the temperature is reduced; before desorption for regeneration, hot chlorine gas at a temperature greater than 50° C. is charged to replace gas in the system, and the temperature is increased to facilitate desorption, and when the temperature reaches 40-70° C., the charging of hot chlorine gas is stopped and the vacuum desorption is started; after the desorption for regeneration is completed, oxygen is used to start the replacement before adsorption; both the tail gas replaced by hot chlorine gas and the tail gas replaced by oxygen gas are sent back to the feed gas system.

The chlorine gas resulting from the separation thereof in the present application may be reused, for example, as a chlorine feed gas for chlorination of other raw materials.

The removed hydrogen chloride and/or oxygen gas and/or hydrochloric acid (after vaporization) in the method of the present invention may be delivered to any reactor.

The purity of chlorine gas obtained from the separation thereof in the method of the present application is up to above 99.6%, which can meet the quality requirements of chlorine feed gas in related industries.

This operation of returning a part of the product gas stream from a last reactor of the reactors from the catalytic oxidation to the reactors without separation thereof according to the present application has an advantage in that: the gas stream containing hydrogen chloride and/or the gas stream containing oxygen for oxidation of the gas stream containing hydrogen chloride is heated directly by the heat of the part of the product gas stream after the catalytic oxidation, such that the gas stream containing hydrogen chloride and/or the gas stream containing oxygen for oxidation of the gas stream containing hydrogen chloride that enters the first reactor reaches an appropriate reaction temperature, and the heating of the gas stream containing hydrogen chloride and/or the gas stream containing oxygen for oxidation of the gas stream containing hydrogen chloride to the appropriate reaction temperature would not have to be achieved totally by an external heat source. Since the product gas stream without separation thereof will not release reaction heat when passing through the catalyst bed layers again, namely, these gases have become relatively "non-reactive" gases only comprising hydrogen chloride, oxygen, chlorine gas, and water vapor without other gas components (a person skilled in the art can understand that, gas streams containing hydrogen chloride may contain little or no other impurity gases having no influence on the catalytic oxidation of hydrogen chloride and also resulting from the production processes in related industries, depending on the sources), when the gas streams containing hydrogen chloride and/or the gas streams containing oxygen for oxidation of the gas stream containing hydrogen chloride that is admixed with the product gas stream pass through the reactors, the temperature in the catalyst bed layers in the reactors has better controllability over the prior art. Moreover, the returned product gas stream only containing hydrogen chloride, oxygen, chlorine gas, and water vapor without other gas components has the same composition as that of the product gas stream resulting from the catalytic oxidation, which greatly decreases difficulties and equipment requirements in the separation operation. In addition, the overall efficiency of the catalytic oxidation in the method of the present invention is not significantly decreased.

In particular, in the present invention, when an excessive amount of oxygen gas is selected to ensure that hydrogen chloride is substantially oxidized, the product gas stream is more easy to be separated. Because of the excessive oxygen gas, the residual amount of hydrogen chloride is small, and even is negligible. Thus, once the product gas stream is condensed, water resulting from the reaction can substantially absorb hydrogen chloride. Following the deep dehydration, separation of chlorine gas and oxygen gas is only needed, such that chlorine gas is separated from oxygen gas to obtain chlorine gas.

By combining the control of reaction heat by returning the product gas stream and/or sequentially providing the gas streams containing hydrogen chloride and/or the gas streams containing oxygen to the downstream reactors, the lifetime of the catalysts in the present method is significantly prolonged.

As known to those skilled in the art, according to the method of the present application, before the product gas stream is returned for the first time, the reaction can be initiated by directly providing a gas stream containing hydrogen chloride and/or a gas stream containing oxygen for oxidation of the gas stream containing hydrogen chloride. Also as known to those skilled in the art, after the catalytic oxidation of the present invention is completed, the whole product gas stream can be separated.

The use of the adiabatic reactors in the present method is advantageous in that no heat removal devices are required in the reactors, which brings out considerable simplification in the structure and reduction of the cost.

Hereafter, the present application will be described with specific embodiments. These specific embodiments are all illustrative, not limiting. By comparison between these examples and the comparative examples, a person skilled in the art can appreciate that the present invention has unexpected technical effects.

Example 1

Figure 1:
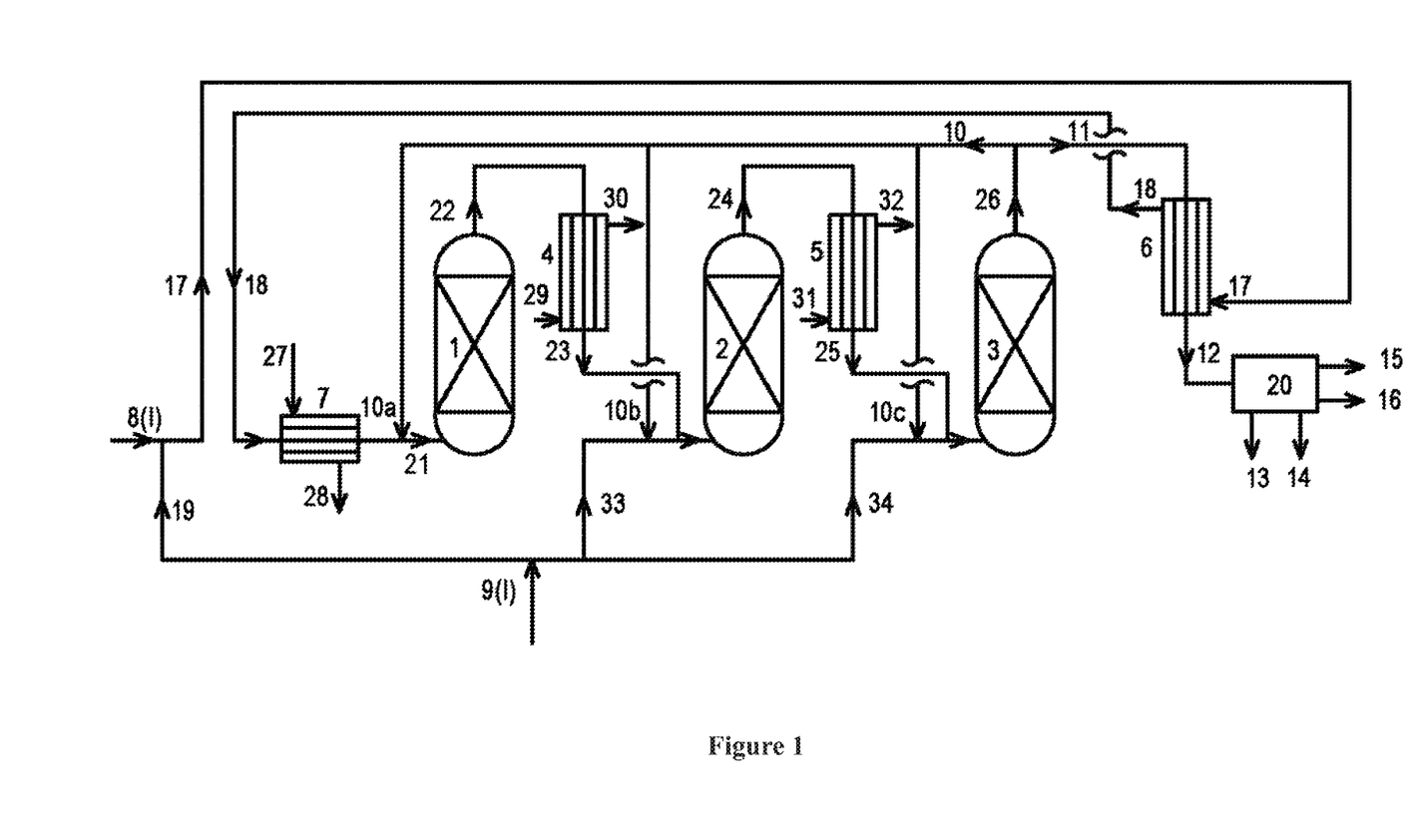
FIG. 1 is a process flow diagram according to Example 1 of the present invention.

The process flow is shown in FIG. 1. In the present embodiment, a recovered oxygen gas 13 and/or a recovered hydrogen chloride 14 obtained by separating a remainder of a product gas stream is not returned to a catalytic oxidation reaction. All of a gas stream containing hydrogen chloride is fed to the first reactor, and gas streams containing oxygen are fed to the reactors.

Step one: before starting the reaction, a catalyst is placed in each stage reactor, the catalytic reaction bed layers containing the catalysts are preheated, and when the reaction bed layer of a first reactor 1 reaches a predetermined reaction temperature, a fresh gas stream containing hydrogen chloride 8(I) and a 19 comprising a fresh gas stream containing oxygen 9(I) are mixed to obtain a mixed gas stream 17 comprising the gas stream containing hydrogen chloride and the gas stream containing oxygen, and the mixed gas stream 17 is preheated through a gas heat exchanger 6 and a preheater 7 to a predetermined temperature and then is charged into the first reactor 1 to start catalytic oxidation of hydrogen chloride.

Step two: after starting the reaction, a product gas stream 22 from the first reactor 1 is passed through a heat exchanger 4, is mixed with other gas streams intended to enter a second reactor (other gas streams refer to a returned product gas stream and a gas stream containing oxygen and/or a gas stream containing hydrogen chloride entering the reactor, the same hereinafter), and then enters a second reactor 2 to continue the reaction; a product gas stream 24 from the second reactor 2 is passed through a heat exchanger 5, is mixed with other gas streams intended to enter a third reactor, and then enters a third reactor 3 to continue the reaction.

Step three: a part of a product gas stream 26 from the third reactor 3 as one-third (10a) of a returned product gas stream 10 is mixed with a gas stream from the preheater 7 before returning to a feed inlet of the first reactor 1, and then is provided to the first reactor 1; one-third (10b) of the returned product gas stream 10 is mixed with a gas stream containing oxygen 33 entering the second reactor before returning to a feed inlet of the second reactor 2, and then is provided to the second reactor 2; one-third (10c) of the returned product gas stream 10 is mixed with a gas stream containing oxygen 34 entering the third reactor before returning to a feed inlet of the third reactor 3, and then is provided to the third reactor 3. The remainder 11 of the product gas stream 26 from the third reactor 3 is passed through the gas heat exchanger 6, and provided to a separation device 20 for separating a product gas stream in the prior art, to obtain recovered oxygen gas 13, recovered hydrogen chloride 14, recovered chlorine gas 15, and recovered hydrochloric acid 16 respectively; further, the mixed gas stream 17 comprising the 19 comprising the fresh gas stream containing oxygen 9(I) and the fresh gas stream containing hydrogen chloride 8(I) is fed to the gas heat exchanger 6 as a cooling medium, and heat exchanged with the product gas stream 11 in the gas heat exchanger 6, to obtain a heat-exchanged mixed gas stream 18 comprising the gas stream containing hydrogen chloride and the gas stream containing oxygen; the heat-exchanged mixed gas stream 18 is passed through the preheater 7 to form a mixed gas 21 with the returned product gas stream 10a that comprises the heat-exchanged mixed gas stream 18 comprising the gas stream containing hydrogen chloride and the gas stream containing oxygen and the returned product gas stream 10a; the mixed gas 21 is provided to the first reactor 1, and then a product gas stream from the previous reactor, a gas stream containing oxygen for oxidation of a gas stream containing hydrogen chloride, and the respective returned product gas streams 10b and 10c are sequentially provided to the second and third reactors to start continuous production.

The separation device 20 for separating a product gas stream in the prior art comprises components (not shown) capable of performing conventional separation operation steps such as condensation, dehydration, adsorption, liquefaction, or the like. Specific separation steps comprise: a) Condensation: the product gas stream from the reaction of the present invention is condensed at a temperature of −5-5° C. and at a pressure of 0.05-10 MPa, water along with a part of unreacted hydrogen chloride is condensed as an aqueous hydrochloric acid solution. b) Deep dehydration: the gas stream after being condensed in step a is subjected to deep dehydration, wherein the drying is performed by the temperature swing adsorption technology using a composite adsorbent layer with two adsorbents in combination wherein the one adsorbent is an alumina adsorbent placed in an upper portion of an adsorber and the other adsorbent is a zeolitic molecular sieve adsorbent for deep dehydration placed in a lower portion of the adsorber, and a volume ratio of the upper alumina adsorbent to the lower adsorbent for deep dehydration is 30%:70%. In the temperature swing adsorption drying, the adsorption pressure is 0.70 MPa and the adsorption temperature is 30° C.; the regeneration operation includes desorption and dehydration processes. The desorption pressure of the regeneration operation is 0.009 MPa and the desorption temperature of the regeneration operation is 160° C.; the dehydration process of the regeneration operation uses a carrier gas at a temperature 180° C. c) Adsorption: the gas stream after being subjected to deep dehydration in step b is passed through a carbon molecular sieve as an adsorbent to remove oxygen gas by adsorption, using the pressure and temperature swing adsorption technology including adsorption and desorption processes, wherein the adsorption pressure is 0.5 MPa, and the temperature in the adsorption stage is gradually decreased from 60° C. to 25° C.; the desorption pressure under reduced pressure is −0.07 MPa and the desorption temperature is 50° C., and the desorption generates a separated gas stream containing oxygen. The remaining gas after adsorption is a gas stream containing chlorine with chlorine gas as a main component. d) Liquefaction: the gas stream containing chlorine obtained in step c is liquefied at a temperature of −20-20° C. and a pressure of 0.05-10 MPa, and then is separated to obtain a gas stream containing hydrogen chloride and a liquefied gas stream containing chlorine after liquefaction.

The recovered oxygen gas 13, recovered hydrogen chloride 14, recovered chlorine gas 15, and recovered hydrochloric acid 16 are obtained through the separation device 20. Optionally, the recovered hydrochloric acid 16 may be vaporized and used for the catalytic oxidation again.

The fresh gas stream containing oxygen 9(I) and the fresh gas stream containing hydrogen chloride 8(I) may be preheated respectively or mixed and then preheated before starting the reaction.

The gas streams containing oxygen 19, 33, 34 to be provided to the first reactor 1, the second reactor 2, and the third reactor 3 respectively are the fresh gas stream containing oxygen 9(I). The ratio of the gas stream containing hydrogen chloride and the gas stream containing oxygen in the mixed gas stream 17 comprising the gas stream containing hydrogen chloride and the gas stream containing oxygen may be adjusted according to circumstances.

Example 2

Figure 2:
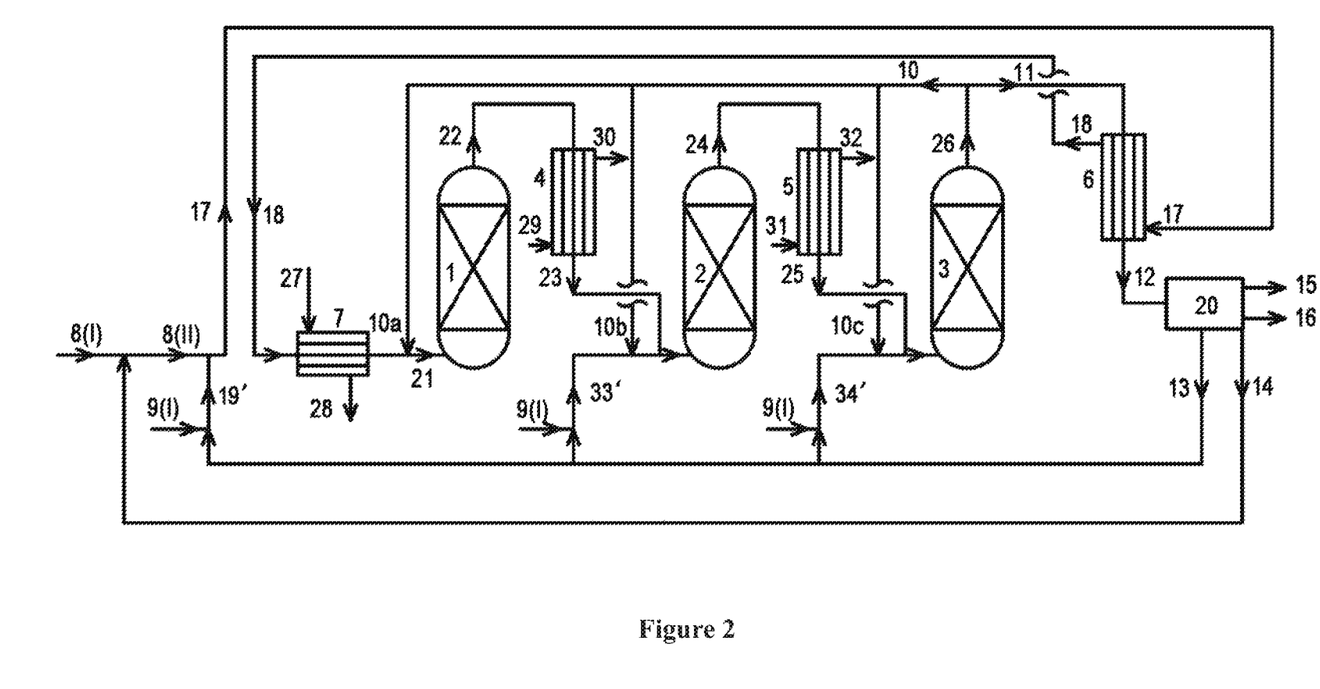
FIG. 2 is a process flow diagram according to Example 2 of the present invention.

The specific process flow of Example 2 is shown in FIG. 2.

In the present embodiment, a recovered oxygen gas 13 and/or a recovered hydrogen chloride 14 obtained by separating a remainder of a product gas stream is returned to continue a catalytic oxidation reaction. All of a gas stream containing hydrogen chloride is fed to the first reactor, and gas streams containing oxygen are fed to the reactors.

The specific procedure is as follows:

Step one: before starting the reaction, a catalyst is placed in each stage reactor, the catalytic reaction bed layers containing the catalysts are preheated, and when the reaction bed layer of a first reactor 1 reaches a predetermined reaction temperature, a fresh gas stream containing hydrogen chloride 8(I) and a fresh gas stream containing oxygen 9(I) are mixed, and a mixed gas stream 17 is preheated through a gas heat exchanger 6 and a preheater 7 to a determined temperature and then is charged into the first reactor 1 to start catalytic oxidation of hydrogen chloride.

Step two: after starting the reaction, a product gas stream 22 from the first reactor 1 is passed through a heat exchanger 4, is mixed with other gas streams intended to enter a second reactor, and then enters a second reactor 2 to continue the reaction; a product gas stream 24 from the second reactor 2 is passed through a heat exchanger 5, is mixed with other gas streams intended to enter a third reactor, and then enters a third reactor 3 to continue the reaction.

Step three: a part of a product gas stream 26 from the third reactor 3 as one-third (10*a*) of a returned product gas stream 10 is mixed with a gas stream from the preheater 7 before returning to a feed inlet of the first reactor 1, and then is provided to the first reactor 1; one-third (10*b*) of the returned product gas stream 10 is mixed with a gas stream containing oxygen 33' entering the second reactor before returning to a feed inlet of the second reactor 2, and then is provided to the second reactor 2; one-third (10*c*) of the returned product gas stream 10 is mixed with a gas stream containing oxygen 34' entering the third reactor before returning to a feed inlet of the third reactor 3, and then is provided to the third reactor 3. The remainder 11 of the product gas stream 26 from the third reactor 3 is passed through the gas heat exchanger 6, and provided to a separation device 20 for separating a product gas stream in the prior art, to obtain recovered oxygen gas 13, recovered hydrogen chloride 14, recovered chlorine gas 15, and recovered hydrochloric acid 16 respectively; the fresh gas stream containing hydrogen chloride 8(I) may be mixed with the recovered hydrogen chloride 14 to form a gas stream containing hydrogen chloride 8(II); the fresh gas stream containing oxygen 9(I) may be mixed with the recovered oxygen gas 13 to form gas streams containing oxygen 19', 33', 34' to be provided to the reactors 1, 2, 3 respectively, wherein in the absence of the recovered oxygen gas 13, the gas streams containing oxygen 19', 33', 34' to be provided to the reactors 1, 2, 3 are the fresh gas stream containing oxygen 9(I). Specifically, the gas streams 19', 33', 34' may be controlled through valves (not shown) in the piping to be gas streams containing the recovered oxygen gas 13, or gas streams containing oxygen comprising the fresh gas stream containing oxygen 9(I) and the recovered oxygen gas 13 in any ratio, or only the fresh gas stream containing oxygen 9(I).

Further, the mixed gas stream 17 comprising the gas stream containing oxygen 19' and the gas stream containing hydrogen chloride 8(II) is fed to the gas heat exchanger 6 as a cooling medium, and heat exchanged with the product gas stream 11 in the gas heat exchanger 6, to obtain a heat-exchanged mixed gas stream 18 comprising the gas stream containing hydrogen chloride and the gas stream containing oxygen; the heat-exchanged mixed gas stream 18 is passed through the preheater 7 to form a mixed gas 21 with the returned product gas stream 10*a* that comprises the heat-exchanged mixed gas stream 18 comprising the gas stream containing hydrogen chloride and the gas stream containing oxygen and the returned product gas stream 10*a*; the mixed gas 21 is provided to the first reactor 1, and then a product gas stream from the previous reactor, a gas stream containing oxygen for oxidation of a gas stream containing hydrogen chloride, and the respective returned product gas streams 10*b* and 10*c* are sequentially provided to the second and third reactors to start continuous production.

The separation device 20 for separating a product gas stream in the prior art comprises components (not shown) capable of performing conventional separation operation steps such as condensation, adsorption, or the like. The recovered oxygen gas 13, recovered hydrogen chloride 14, recovered chlorine gas 15, and recovered hydrochloric acid 16 are obtained through the separation device 20. Optionally, the recovered hydrochloric acid 16 may be vaporized and used for the catalytic oxidation again.

The fresh gas stream containing oxygen 9(I) and the fresh gas stream containing hydrogen chloride 8(I) may be preheated respectively or mixed and then preheated before starting the reaction. The ratio of the fresh gas stream containing hydrogen chloride 8(I), the recovered hydrogen chloride 14, the fresh gas stream containing oxygen 9(I), and the recovered oxygen gas 13 in the mixed gas stream 17 comprising the gas stream containing hydrogen chloride and the gas stream containing oxygen may be adjusted according to circumstances.

Example 3

Figure 3:
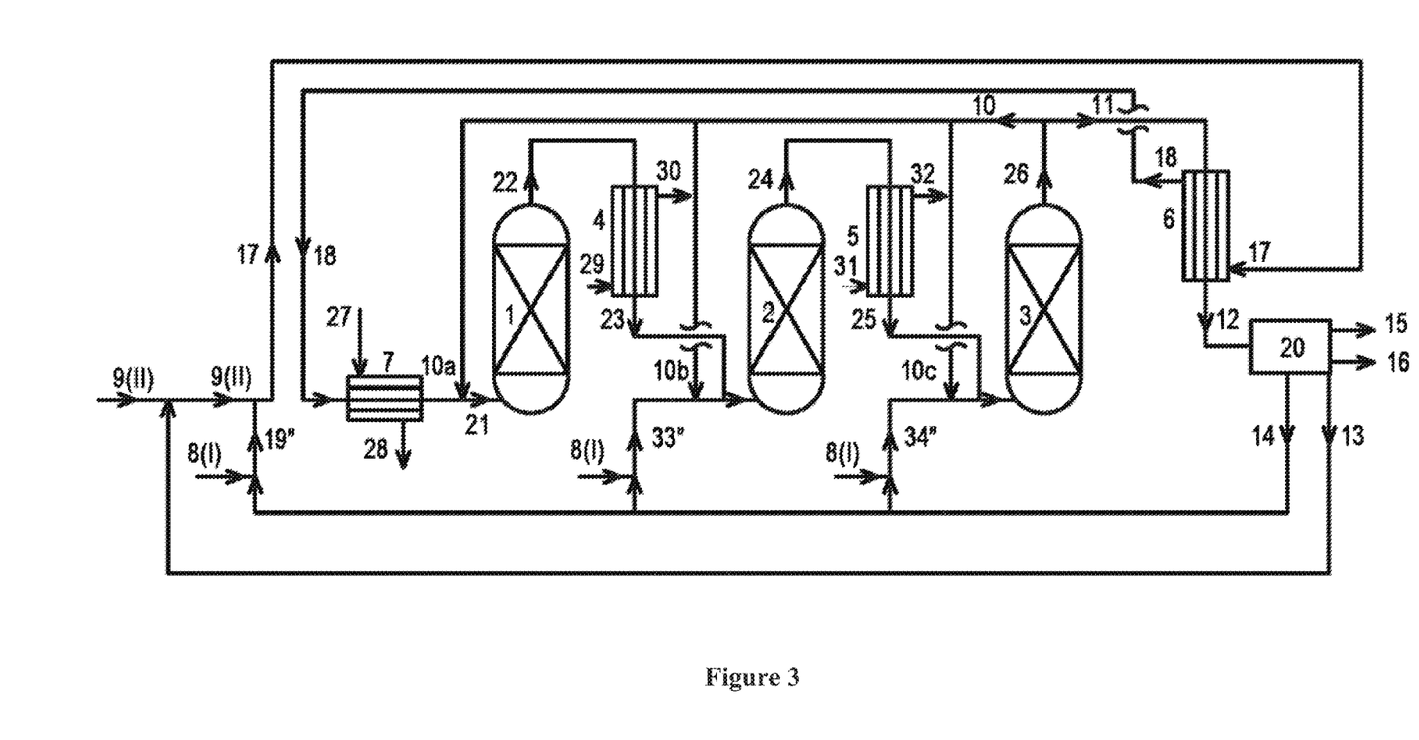
FIG. 3 is a process flow diagram according to Example 3 of the present invention.

The process flow is shown in FIG. 3.

In the present embodiment, a recovered oxygen gas 13 and/or a recovered hydrogen chloride 14 obtained by separating a remainder of a product gas stream is returned to continue a catalytic oxidation reaction. All of a gas stream containing oxygen is fed to the first reactor, and gas streams containing hydrogen chloride are fed to the reactors.

The specific procedure is as follows:

Step one: before starting the reaction, a catalyst is placed in each stage reactor, the catalytic reaction bed layers containing the catalysts are preheated, and when the reaction bed layer of a first reactor 1 reaches a predetermined reaction temperature, a fresh gas stream containing oxygen 9(I) and a fresh gas stream containing hydrogen chloride 8(I) are mixed, and a mixed gas stream is preheated through a gas heat exchanger 6 and a preheater 7 to a determined temperature and then is charged into the first reactor 1 to start catalytic oxidation of hydrogen chloride.

Step two: after starting the reaction, a product gas stream 22 from the first reactor 1 is passed through a heat exchanger 4, is mixed with other gas streams intended to enter a second reactor, and then enters a second reactor 2 to continue the reaction; a product gas stream 24 from the second reactor 2 is passed through a heat exchanger 5, is mixed with other gas streams intended to enter a third reactor, and then enters a third reactor 3 to continue the reaction.

Step three: a part of a product gas stream 26 from the third reactor 3 as one-third (10a) of a returned product gas stream 10 is mixed with a gas stream from the preheater 7 before returning to a feed inlet of the first reactor 1, and then is provided to the first reactor 1; one-third (10b) of the returned product gas stream 10 is mixed with a gas stream containing hydrogen chloride 33" entering the second reactor before returning to a feed inlet of the second reactor 2, and then is provided to the second reactor 2; one-third (10c) of the returned product gas stream 10 is mixed with a gas stream containing hydrogen chloride 34" entering the third reactor before returning to a feed inlet of the third reactor 3, and then is provided to the third reactor 3. The another portion 11 of the product gas stream 26 from the third reactor 3 is passed through the gas heat exchanger 6, and provided to a separation device 20 for separating a product gas stream in the prior art, to obtain recovered oxygen gas 13, recovered hydrogen chloride 14, recovered chlorine gas 15, and recovered hydrochloric acid 16 respectively; the fresh gas stream containing oxygen 9(I) may be mixed with the recovered oxygen gas 13 to form a gas stream containing oxygen 9(II); the fresh gas stream containing hydrogen chloride 8(I) may be mixed with the recovered hydrogen chloride 14 to form gas streams containing hydrogen chloride 19", 33", 34" to be provided to the reactors 1, 2, 3 respectively, wherein in the absence of the recovered hydrogen chloride 14, the gas streams containing hydrogen chloride 19", 33", 34" to be provided to the reactors 1, 2, 3 are the fresh gas stream containing hydrogen chloride 8(I). Specifically, the gas streams 19", 33", 34" may be controlled through valves (not shown) in the piping to be gas streams containing the recovered hydrogen chloride 14, or gas streams containing hydrogen chloride comprising the fresh gas stream containing hydrogen chloride 8(I) and the recovered hydrogen chloride 14 in any ratio, or only the fresh gas stream containing hydrogen chloride 8(I).

Further, the mixed gas stream 17 comprising the gas stream containing oxygen 9(II) and the gas stream containing hydrogen chloride 19" is fed to the gas heat exchanger 6 as a cooling medium, and heat exchanged with the product gas stream 11 in the gas heat exchanger 6, to obtain a heat-exchanged mixed gas stream 18 comprising the gas stream containing hydrogen chloride and the gas stream containing oxygen; the heat-exchanged mixed gas stream 18 is passed through the preheater 7 to form a mixed gas 21 with the returned product gas stream 10a that comprises the heat-exchanged mixed gas stream 18 comprising the gas stream containing hydrogen chloride and the gas stream containing oxygen and the returned product gas stream 10a; the mixed gas 21 is provided to the first reactor 1, and then a product gas stream from the previous reactor, a gas stream containing hydrogen chloride, and the respective returned product gas streams 10b and 10c are sequentially provided to the second and third reactors to start continuous production.

The separation device 20 for separating a product gas stream in the prior art comprises components (not shown) capable of performing conventional separation operation steps such as condensation, dehydration, adsorption, or the like. Specific separation steps comprise: a) Condensation: the product gas stream from the reaction of the present invention is condensed at a temperature of −5-5° C. and at a pressure of 0.05-10 MPa, water along with a part of unreacted hydrogen chloride is condensed as an aqueous hydrochloric acid solution. b) Deep dehydration: the gas stream after being condensed in step a is subjected to deep dehydration, wherein the drying is performed by the pressure swing adsorption technology using a composite adsorbent layer with two adsorbents in combination wherein the one adsorbent is an alumina adsorbent placed in an upper portion of an adsorber and the other adsorbent is a zeolitic molecular sieve adsorbent for deep dehydration placed in a lower portion of the adsorber, and a volume ratio of the upper alumina adsorbent to the lower adsorbent for deep dehydration is 40%:60%. In the pressure swing adsorption drying, the adsorption pressure is 0.40 MPa, the desorption pressure is 0.02 MPa, and the adsorption temperature is ambient temperature. c) Adsorption: the gas stream after being subjected to deep dehydration in step b is passed through a carbon molecular sieve as an adsorbent to remove oxygen gas by adsorption, using the pressure and temperature swing adsorption technology including adsorption and desorption processes, wherein the adsorption pressure is 0.20 MPa, and the temperature in the adsorption stage is gradually decreased from 40° C. to 20° C.; the desorption pressure under vacuum is −0.07 MPa and the desorption temperature is 40° C., and the desorption generates a separated gas stream containing oxygen. The remaining gas after adsorption is a gas stream containing chlorine with chlorine gas as a main component. Because the feed volume ratio of hydrogen chloride and oxygen gas is 1:1, the residual unreacted hydrogen chloride is substantially absorbed during the condensation by water generated in the reaction. Additional separation of hydrogen chloride is not required for chlorine gas.

The recovered oxygen gas 13, recovered chlorine gas 15, and recovered hydrochloric acid 16 are obtained through the separation device 20. Optionally, the recovered hydrochloric acid 16 may be vaporized and used for the catalytic oxidation again.

The fresh gas stream containing oxygen 9(I) and the fresh gas stream containing hydrogen chloride 8(I) may be preheated respectively or mixed and then preheated before starting the reaction.

gas stream 26 from the third reactor is directly fed to the separation device for separating a product gas stream in the prior art.

Specific process conditions of Examples 1, 2, 3, 4 and Comparative Examples 1, 2, 3, 4 are shown in the table below. The catalysts indicated in the table are: Ruthenium-copper composite catalyst 1: in the catalyst, copper is 5.2%, potassium is 0.5%, rare earth metal cerium is 0.4%, and ruthenium is 2.5%, with the balance being a support, by weight of the catalyst.

| Ru—Cu composite catalyst 2: Cu 9.2%, K 0.6%, Ce 0.5%, and Ru 5.0%, balance being a support, by weight of the Cat. | Example 1 | Example 2 | Example 3 | Example 4 | Comparative example 1 | Comparative example 2 | Comparative example 3 | Comparative example 4 |
|---|---|---|---|---|---|---|---|---|
| Volume ratio of 10:11 (returned: remaining product gas stream) | 0.5:0.5 | 0.3:0.7 | 0.5:0.5 | 0.3:0.7 | 0 | 0 | 0 | 0 |
| Feeding mode of the gas stream containing HCl | Totally entering the first reactor | Totally entering the first reactor | Separately entering the reactors in a volume ratio of 1:1:1 | Separately entering the reactors in a volume ratio of 0.5:1:1.5 | Totally entering the first reactor | Totally entering the first reactor | Separately entering the reactors in a volume ratio of 1:1:1 | Separately entering the reactors in a volume ratio of 0.5:1:1.5 |
| Feeding mode of the gas stream containing O2 | Separately entering the reactors in a volume ratio of 1:1:1 | Separately entering the reactors in a volume ratio of 0.5:1:1.5 | Totally entering the first reactor | Totally entering the first reactor | Separately entering the reactors in a volume ratio of 1:1:1 | Separately entering the reactors in a volume ratio of 0.5:1:1.5 | Totally entering the first reactor | Totally entering the first reactor |
| Feed volume ratio of HCl and O2 gas | 3:1 | 2.5:1 | 1:1 | 0.9:1.1 | 3:1 | 2.5:1 | 1:1 | 0.9:1.1 |
| Gas stream containing HCl (calculated based on pure HCl), m$^3$/h | 172.5 | 292.86 | 125 | 177.75 | 172.5 | 292.86 | 125 | 177.75 |
| Gas stream containing O2 (calculated based on pure O2), m$^3$/h | 57.5 | 117.14 | 125 | 217.25 | 57.5 | 117.14 | 125 | 217.25 |
| Feed temp. of the 1st reactor | 310 | 325 | 360 | 313 | 310 | 325 | 360 | 313 |
| Catalyst | Ru—Cu composite catalyst 1 | Ru—Cu composite catalyst 2 | Ru—Cu composite catalyst 1 | Ru—Cu composite catalyst 2 | Ru—Cu composite catalyst 1 | Ru—Cu composite catalyst 2 | Ru—Cu composite catalyst 1 | Ru—Cu composite catalyst 2 |

The ratio of the fresh gas stream containing hydrogen chloride 8(I), the recovered hydrogen chloride 14, the fresh gas stream containing oxygen 9(I), and the recovered oxygen gas 13 in the mixed gas 17 comprising the gas stream containing hydrogen chloride and the gas stream containing oxygen may be adjusted according to circumstances.

Example 4

The specific process flow of Example 4 is the same as the process flow of Example 3. Specific process parameters of Example 4 and specific process parameters of Example 3 are shown in the table below, respectively.

Comparative Examples 1-4

The process conditions of Comparative Examples 1, 2, 3, 4 are substantially the same as Examples 1, 2, 3, 4, only with a difference in that no product gas stream is returned in Comparative Examples 1, 2, 3, 4, namely, all of the product The results of Examples 1-4 and Comparative Examples 1-4 are shown in the table 2 below:

| | HCl conversion rate at various time points (%) | | | |
|---|---|---|---|---|
| | 50 h | 100 h | 500 h | 1000 h |
| Example 1 | 79 | 76 | 75 | 72 |
| Comparative example 1 | 70 | 65 | 60 | 57 |
| Example 2 | 79 | 76 | 72 | 70 |
| Comparative example 2 | 70 | 64 | 61 | 56 |
| Example 3 | 96 | 95 | 92 | 90 |
| Comparative example 3 | 95 | 92 | 87 | 83 |
| Example 4 | 96 | 93 | 90 | 88 |
| Comparative example 4 | 94 | 91 | 86 | 81 |

We claim:
1. A method for preparing chlorine, comprising
providing a first reactor and one or more downstream reactors, each of the first and one or more downstream reactors being filled with a catalyst and connected in series;

feeding a first gas stream containing hydrogen chloride and a first gas stream containing oxygen to the first reactor, and feeding a replenishing gas stream containing hydrogen chloride or a replenishing gas stream containing oxygen to the one or more downstream reactors;

carrying out a catalytic oxidation of the hydrogen chloride in the first and the one or more downstream reactors, wherein an effluent gas stream obtained in each reactor is fed into the next downstream reactor;

obtaining a last effluent gas stream from the last reactor of the one or more downstream reactors, and dividing the last effluent gas stream into a recycling stream and a remaining stream, returning the recycling stream to any of the first reactor or the one or more downstream reactors without separation of products; and separating and recovering chlorine product from the remaining stream.

2. The method according to claim 1, further comprising mixing the recycling stream with the first gas stream containing hydrogen chloride and the first gas stream containing oxygen to form a mixture and feeding the mixture to the first reactor; or mixing the recycling stream with the replenishing gas stream containing hydrogen chloride or the replenishing gas stream containing oxygen, to form a mixture and feeding the mixture to any of the one or more downstream reactors.

3. The method according to claim 1, wherein the replenishing gas stream containing oxygen is provided to the one or more downstream reactors.

4. The method according to claim 3, wherein the first gas stream containing oxygen provided to the first reactor and the replenishing gas streams containing oxygen to the one or more downstream reactors are portions of a gas stream containing oxygen for oxidation of a gas stream containing hydrogen chloride that are distributed among the first reactor and one or more downstream reactors at a desired ratio.

5. The method according to claim 1, wherein the replenishing gas stream containing hydrogen chloride is provided to the one or more downstream reactors; and an oxygen content in the gas streams entering each of the first reactor and one or more downstream reactors is greater than a theoretical oxygen consumption required for oxidation of hydrogen chloride content in the gas streams entering each of the first reactor and one or more downstream reactors.

6. The method according to claim 5, wherein the first gas stream containing hydrogen chloride provided to the first reactor and the replenishing gas streams containing hydrogen chloride provided to the one or more downstream reactors are portions of a gas stream containing hydrogen chloride to be oxidized that are distributed among the first reactor and the one or more downstream reactors in a desired ratio.

7. The method according to claim 1, further comprising flowing the effluent gas stream from each reactor through a heat exchanger before feeding it into the next downstream reactor;

providing the replenishing gas stream containing oxygen to the one or more downstream reactors;

mixing a part of the recycling stream with the first gas stream containing hydrogen chloride and the first gas stream containing oxygen to form a first mixture gas, and feeding the first mixture gas to the first reactor; and mixing remaining parts of the recycling stream with the replenishing gas stream containing oxygen to form a second mixture gas, and feeding the second mixture gas to the one or more downstream reactors.

8. The method according to claim 1, further comprising flowing the effluent gas stream from each reactor through a heat exchanger before feeding it into the next downstream reactor;

providing the replenishing gas stream containing hydrogen chloride to the one or more downstream reactors;

mixing a part of the recycling stream with the first gas stream containing hydrogen chloride and the first gas stream containing oxygen to form a first mixture gas, and feeding the first mixture gas to the first reactor; and mixing remaining part of the recycling stream with the replenishing gas stream containing hydrogen chloride, to form a second mixture gas, and feeding the second mixture gas to the one or more downstream reactors.

9. The method according to claim 1, wherein the recycling stream is divided into multiple parts and each part is returned to each of the first reactor and the one or more downstream reactors without separation of products.

10. The method according to claim 9, wherein the multiple parts of the recycling stream is equal to the number of the first reactor and the one or more downstream reactors.

11. The method according to claim 1, wherein the separating and recovering of the chlorine product from the remaining stream is by removing residual hydrogen chloride with water, drying, and separating the chlorine gas from oxygen gas by adsorption; or removing water and a part of hydrogen chloride gas by condensation and drying, separating out liquid chlorine through a rectification tower, and removing hydrogen chloride by water washing.

12. The method according to claim 1, wherein the separating and recovering the chlorine product from the remaining stream is by condensing the remaining stream whereby water in the remaining stream and a part of unreacted hydrogen chloride are condensed as an aqueous hydrochloric acid solution, subjecting the gas stream obtained after the condensing step to concentrated sulfuric acid, molecular sieve, temperature swing adsorption, or pressure swing adsorption, to remove residual moisture for deep dehydration, adsorbing the gas stream obtained after the deep dehydration by contacting it with an adsorbent to remove oxygen gas; and optionally, subjecting the gas stream after removing oxygen gas to to form a gas stream containing hydrogen chloride and a liquefied stream containing the chlorine.

13. The method according to claim 1, wherein each of the first reactor and the one or more downstream reactors optionally has a heat exchanger disposed therebehind for removing reaction heat.

14. The method according to claim 13, wherein the remaining stream is passed through a gas heat exchanger for heat exchanging before separation of chlorine product, and the heat exchanging is performed in the gas heat exchanger using the first gas stream containing hydrogen chloride, the first gas stream containing oxygen or both, as a cooling medium.

15. The method according to claim 1, wherein the separating and recovering the chlorine gas is performed on the remaining stream via dehydration, removal of residual hydrogen chloride, and removal of oxygen gas.

16. The method according to claim 15, wherein the removed hydrogen chloride, oxygen gas, or both, is delivered to any of the first reactor and one or more downstream reactors.

17. The method according to claim 1, wherein a volume ratio of the recycling stream to the remaining stream is 0.25:0.75 to 0.75:0.25.

18. The method according to claim 1, wherein 2 to 10 adiabatic reactors are connected in series.

19. The method according to claim 1, wherein the catalyst is a ruthenium catalyst, copper catalyst, or copper-ruthenium composite catalyst, the catalyst is optionally doped with a co-catalyst, the co-catalyst is gold, palladium, platinum, osmium, iridium, nickel, or chromium, and the catalyst is optionally loaded onto a support.

20. The method according to claim 1, wherein pressure within the first reactor and the one or more downstream reactors is 0.1-1 MPa.

21. The method according to claim 1, wherein feed temperature of each of the first reactor and the one or more downstream reactors is 250-450° C.

22. The method according to claim 1, wherein the first reactor and the one or more downstream reactors are fixed beds or fluidized beds.

23. The method according to claim 1, wherein the first reactor and the one or more downstream reactors are made of pure nickel, nickel alloy, quartz, or a ceramic.

* * * * *